United States Patent [19]
Schott

[11] 3,800,606
[45] Apr. 2, 1974

[54] INFINITELY VARIABLE TRANSMISSION WITH LUBRICATING WICK MEANS

[76] Inventor: Lawrence A. Schott, 13930 Stansbury, Detroit, Mich. 48227

[22] Filed: July 13, 1972

[21] Appl. No.: 271,248

[52] U.S. Cl. .................................. 74/198, 64/21
[51] Int. Cl. ............................................ F16h 13/00
[58] Field of Search............ 74/198, 193; 308/87 R, 308/187, 189 A; 64/21

[56] References Cited
UNITED STATES PATENTS

| 1,398,417 | 11/1921 | Chicken et al. | 74/198 |
| 2,512,717 | 6/1950 | Dicke | 74/198 |
| 3,092,426 | 6/1963 | Bailey | 308/87 R |
| 1,881,750 | 10/1932 | Llewellyn | 308/189 A |
| 3,290,101 | 12/1966 | Recknagel | 308/187 |
| 2,006,026 | 6/1935 | Midthun | 64/21 |

FOREIGN PATENTS OR APPLICATIONS

| 864,021 | 1/1953 | Germany | 74/198 |

Primary Examiner—Benjamin W. Wyche
Assistant Examiner—Allan Russell Burke
Attorney, Agent, or Firm—Hauke, Gifford, Patalidis & Dumont

[57] ABSTRACT

A variable speed drive mechanism in which power is transmitted from an input driving disc to an output driven disc through an intermediate member of spherical configuration. The driving and driven discs are supported with their axes of rotation at an angle and offset. The intermediate spherical member is held by gravity or other means in the trough defined between the two inclined discs. A cage member holds and linearly guides the intermediate member and a wick provides lubrication for the intermediate member. The radial position of the spherical intermediate member along the faces of the discs determines the drive ratio between the input and output shafts of the mechanism.

6 Claims, 7 Drawing Figures

INFINITELY VARIABLE TRANSMISSION WITH LUBRICATING WICK MEANS

Cross Reference to Related Application

This application is broadly similar to U. S. application Ser. No. 102,393 now U.S. Pat. No. 3,698,255 filed on Dec. 29, 1970 for "Motion Transmitting Mechanism."

BACKGROUND OF THE INVENTION

This invention relates to a speed changing, motion transmitting mechanism, and more particularly to a mechanism of the friction drive type which includes a pair of mutually inclined discs as the driving and driven elements between an input shaft and an output shaft.

The prior art discloses friction transmission devices which incorporate driving and driven discs, in some cases with intermediate spherical members. An example of such a construction is disclosed in U. S. Pat. No. 2,209,254 issued to Y. A. Ahnger on July 23, 1940 for "Friction Transmission Device." In the mechanism shown and described in that patent, the driving and driven discs may be characterized as being mounted on skewed shafts or shafts which include intermediate gear trains to return them to parallel alignment. The present invention includes improvements relative to the cage structure for the intermediate drive member and the means for mounting the driving and driven discs.

U. S. Pat. No. 2,512,717 issued to R. H. Dicke on June 27, 1950 for "Power Transmission" also discloses a system for transmitting power from one disc to another disc through a spherical intermediate ball. The input and output shafts for mounting the discs are skewed one relative to the other. The present invention represents a substantial improvement relative to that arrangement, particularly with respect to the disc and shaft mounting construction.

Another disc-type power transmission is disclosed in U. S. Pat. No. 1,803,834, issued to M. F. Bates on May 5, 1931 for "Power Transmission." This patent, like the other prior art patents referred to above, does not teach the improvements involved in the present invention with respect to the disc and shaft mounting arrangement and the lubricating wick.

SUMMARY OF THE PRESENT INVENTION

The present invention will thus be seen to provide an improved slip-free frictional disc drive wherein a motion and torque transmitting intermediate ball is rotatably wedged between two angled discs in such manner as to prevent back rotation or slippage of the intermediate ball. The invention provides many improvements, particularly with respect to insuring great rigidity in the bearing structure for the discs, by providing appropriate thrust and radial bearing support therefor, and by providing constant angular velocity drive means between the input shaft and the input disc and between the output disc and the output shaft, respectively. An additional improvement of the present invention over the prior art is that of a lubricating system in which a wick-type lubricating member is supported along with the intermediate ball by the ball guide cage and is maintained in continuous wiping engagement with the ball. The improved support structure for the two discs permits maintaining both the associated input and output shafts in parallel relationship.

BRIEF DESCRIPTION OF THE DRAWINGS

The present invention is described in the accompanying specification and illustrated in the accompanying drawings in which like numerals are used to refer to like parts in the several views presented, and wherein.

DETAILED DESCRIPTION OF THE PRESENT INVENTION

Figure 1:
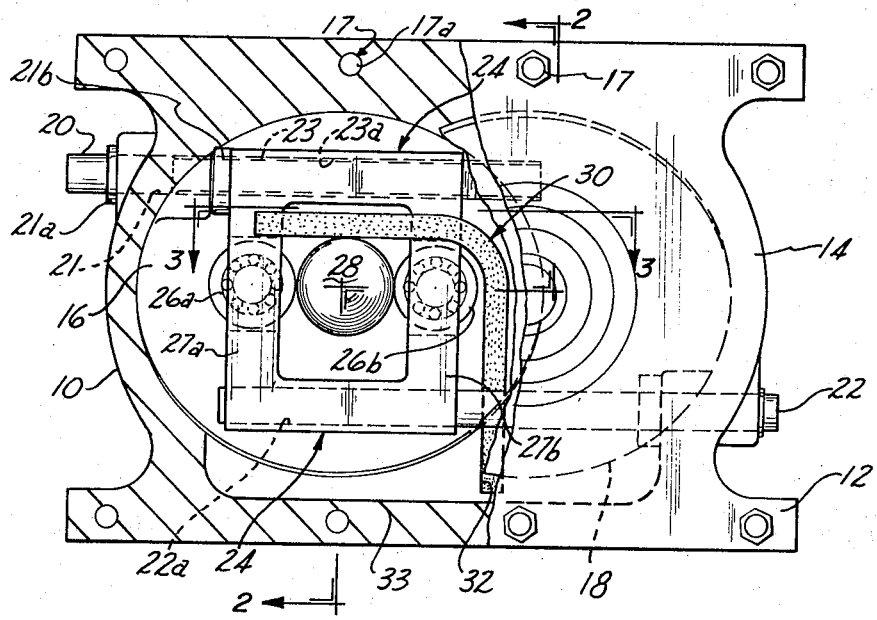
FIG. 1 is a side elevational view of a motion transmitting mechanism incorporating the present invention, with portions broken away to show the internal construction.
Figure 2:
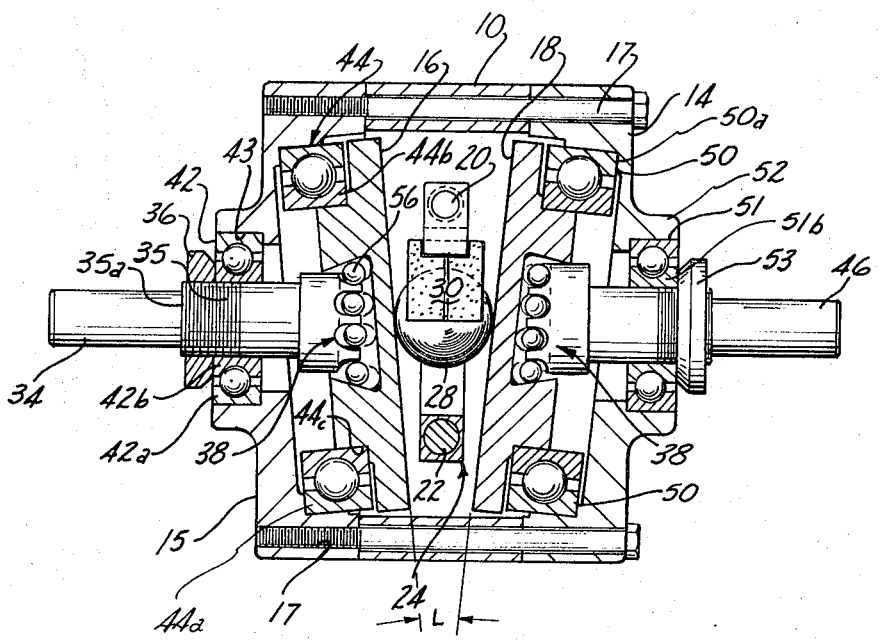
FIG. 2 is a cross-sectional view partly along the line 2—2 of FIG. 1.

With reference to FIGS. 1-2 of the drawing, an example of motion transmitting mechanism according to the present invention is illustrated mounted in a housing 10 provided with an integral base 12, and enclosed at both ends by end plates 14 and 15. The end plates 14 and 15 are fastened to the ends of the housing 10 by any convenient means such as bolts 17. The end plate 15 supports a rotatable disc 16 and the end plate 14 supports a rotatable disc 18, the plane of the face of the disc 16 being at an angle to the plane of the face of the disc 18, and the axes of rotation of the discs being laterally offset. Projecting from the side of the housing between the two spaced and angled discs 16 and 18, there is a pair of vertically spaced parallel support rods 20 and 22 for a cage 24. The support rod 20 journals in an appropriate transverse bore 21 through the wall of the housing 10, and is held against longitudinal motion by means of end thrust bearings 21a and 21b. The portion of the rod 20 projecting within the housing 10 is provided with a peripheral thread 23 engaged in a similarly threaded bore 23a in the upper side of the cage 24. The rod 22 is fixedly mounted on the housing 10, and projects through a bore 22a in the lower side of the cage 24. The cage 24 is thus supported by the rods 20 and 22 between the two discs 16 and 18, and is displaceable laterally in one direction or the other, when the rod 20 is rotated in one direction or the other.

The cage 24 is in the form of a generally open rectangular frame supporting a pair of freely rotatable cylindrical rollers 26a and 26b, each of which is rotatably mounted on one of a pair of spaced vertical sides 27a and 27b of the cage 24. An intermediate drive member, or ball, 28 is disposed between the rollers 26a and 26b for free rotative support and linear guidance thereby in wedging engagement with the opposed and angled faces of the discs 16 and 18. When the cage 24 is linearly displaced leftwardly or rightwardly as seen in FIG. 1, as a result of rotating the threaded rod member 20 in one direction or the other, the cage 24 carries along the ball 28 about a radius of each of both discs 16 and 18, and thus causes a variation in the ratio of the rotational velocity of the driven disc relative to the driving disc. The velocity ratio varies as a function of the relative distances from the center of each disc of the points of contact of the ball 28 with the surface of each disc. For example, if disc 16 is the input or driving disc and disc 18 is the output or driven disc, as the cage 24 controlling the radial position of the ball is moved rightwardly, as seen in FIG. 1, and therefore closer to the center of the driven disc 18, an increase in the RPM of the output shaft 46 connected to the disc 18 will result, even though the RPM of the input shaft 34 remains constant. For example, the intermediate drive member, or ball, 28 may be placed at a point which is equally distant from the centers of the discs 16 and 18. The driven disc 18 and its associated output shaft 46 thus rotate at exactly the same speed as the driving disc 16 and its associated input shaft 34. As the intermediate drive member, or ball, 28 is displaced by the cage 24 nearer the periphery of the driving disc 16 and nearer the center of the driven disc 18, the RPM of the output shaft 46 is gradually increased. It will be appreciated that the peripheral surface of the roller 26a or 26b engages the peripheral surface of the ball 28 only when the ball is urged linearly in one direction or the other along the faces of the discs as a result of the cage 24 being controllably displaced for the purpose of varying the drive ratio between the discs.

Figure 3:
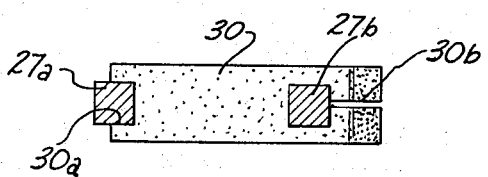
FIG. 3 is a sectional view taken along the section line 3—3 of FIG. 1.

Also shown in FIGS. 1-2 is the arrangement used to provide a uniform lubrication film about the periphery of the intermediate drive member, or ball, 28, which comprises a fluid absorbent member or wick 30 in engagement with the surface of the ball 28 which is supported on the cage 24 and which has a downwardly depending end 32 dipped in the lubricating oil 33 contained in the housing 10. As best seen in FIG. 3, the wick 30 is cut-out at 30a and slit at 30b to fit over the sides 27a and 27b of the cage 24.

As best shown at FIG. 2, the input or driving disc 16 is mounted on the end of the input shaft 34 and supported with its face in a predetermined angular relationship relative to the surface of the driven disc 18 and is connected to the shaft 34 through the intermediary of an constant angular velocity coupling 38.

The input shaft 34 journals through the end plate 15 by being supported by a ball bearing 42, the outer race 42a whereof is press-fitted in the shouldered recess 43 in the end plate 15. The inner race 42b of the ball bearing 42 engages the periphery of an enlarged portion 35 of the shaft 34, and a retainer ring or nut 36, threaddedly engaging the threaded peripheral surface portion 35a of the shaft, engages the annular end surface of the inner race 42b of the ball bearing so as to exert a leftwardly directed pull on the shaft 34 to preload the ball bearing 42 and a thrust ball bearing 44 rotatably supporting the disc 16 from the end plate 15. The ball bearing 44 is retained within a recess formed in the inner surface of the end plate 15 and includes an outer raceway 44a fitted in that recess and fitted over a reduced diameter portion 44c in the rear face of the disc 16.

The output or driven disc 18 is supported in a similar manner from the inner face of the end plate 14 by way of a thrust ball bearing 50. A ball bearing 51 supports the output shaft 46 journaled through the end plate 14, and the ball bearing 51 is retained and preloaded, together with the thrust bearing 50, by means of the threaded retainer nut 53. The output shaft 46 and the disc 18 are interconnected by way of an angular constant velocity coupling 38 identical in structure to the coupling 38 interconnecting the input shaft 34 and disc 16.

As will be seen best in FIG. 2, the planes of the opposed faces of the discs 16 and 18 are at an acute angle L, which preferably lies within the range of greater than zero and less than 30°. The importance of this angular relationship with regard to transmitting a slip-free motion from one disc to the other through the ball 28 as a result of rotatably wedging the ball 28 between the disc faces is set forth and explained in detail in the aforementioned application Ser. No. 102,393 of which the present application is a continuation-in-part application. The ball 28, being in a free rolling contact with the disc faces, may be radially displaced along the trough formed between the faces of the two discs 16 as a result of the controlled linear displacement of the cage 24, as previously mentioned, to provide the changes of the relative speed between the input shaft 34 and the output shaft 46 in such manner as to provide an infinitely variable drive ratio. The preload exerted on all the bearing supports of the rotational parts of the transmission assembly of the invention by means of the adjustable bearing retainers 36 and 53 eliminates play and backlash and takes up any elastic deformation of the discs and other components by pre-stressing such components, thus resulting in a rigid structure eliminating vibrations and erratic slippage and "digging" of the ball 28 relative to the faces of the discs 16 and 18.

The constant angular velocity couplings 38 connecting respectively the input shaft 34 to the disc 16 and the disc 18 to the output shaft 46 are a particularly important aspect of the present invention which permit the input shaft 34 and the output shaft 46 to have their axes of rotation parallel and in a single plane while permitting the angled discs 16 and 18 to have their opposed faces inclined one relative to the other and the axis of rotation of each disc to be at an angle relative to the axis of rotation of the shaft connected thereto. The constant angular velocity couplings 38 further permit the shafts 34 and 46 to be independently supported in the housing end plates 15 and 14, respectively, and the discs to be independently supported by the thrust bearings 44 and 50, respectively, while being able to transmit the preload force resulting from the axial pull exerted on the shafts 34 and 46, respectively, by the bearing retainers 36 and 53.

Figure 4:
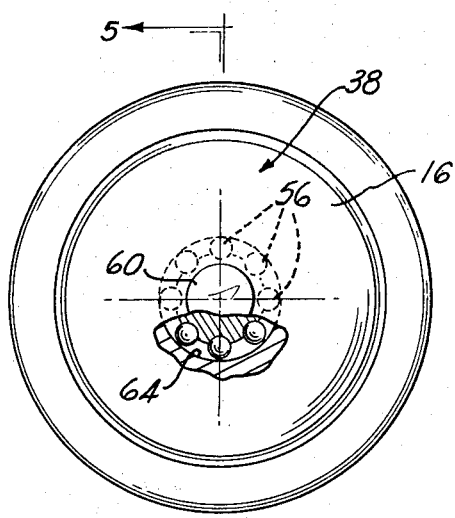
FIG. 4 is an end elevational view of one of the discs in the transmission.
Figure 5:
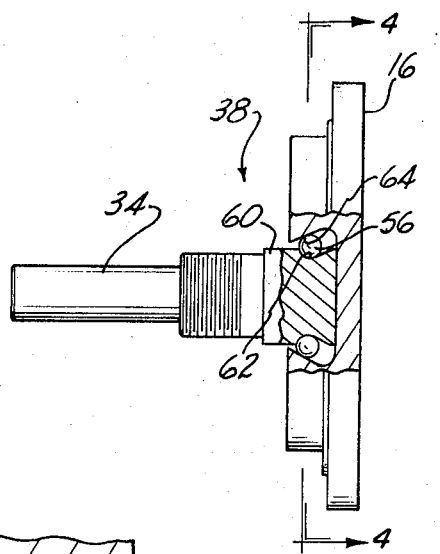
FIG. 5 is a view along the section line 5—5 of FIG. 4.

As shown at FIGS. 2, 4 and 5, the constant angular velocity coupling 38 between the input shaft 34 and disc 16, which is identical to the coupling 38 between the output disc 18 and shaft 46, is formed at the enlarged end portion 60 of the shaft 34, and comprises a plurality of socket-like spherical pockets 62 each adapted to receive a ball 56. The rear face of the disc 16 is provided with a cupped recessed portion 64, having in its wall a plurality of conforming socket-like pockets 66, each adapted to accept one of the balls 56. The torque transmitted from the shaft 34 to the disc 16 is thus transmitted through the intermediary of a plurality of balls 56 engaging respectively the spherical socket-like pockets 62 on the end of the shaft and the socket-like pocket 64 in the wall of the cupped portion of the disc.

Figure 6:
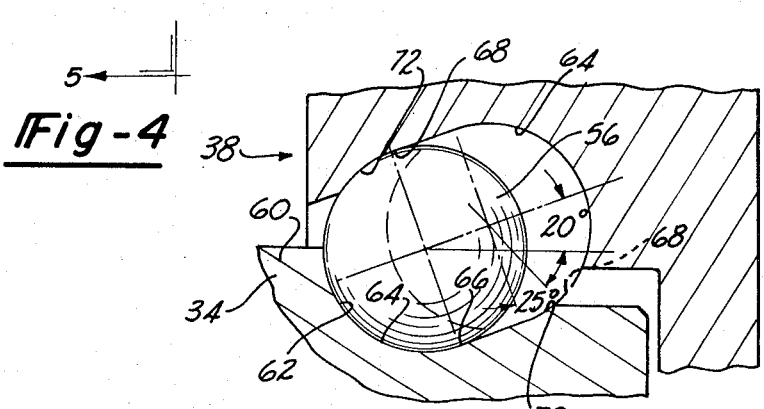
FIG. 6 is a view at an enlarged scale of a portion of FIG. 5.

As shown in particular detail at FIG. 6, both the socket-like spherical pockets 62 on the end of the shaft and the socket-like pockets 64 in the wall of the lipped portion of the disc have a short, straight, cylindrical, concave portion, shown at 66 and 68 respectively, the axis of which is inclined, in the example shown, at about 20° relatively to the axes of symmetry of the shaft and of the disc. This angle of 20° corresponds substantially to half of the angle between the axes of rotation of the disc 16 and of the shaft 34 when in normal operation as shown in FIG. 2. The straight cylindrical portion 66 of the socket-like pocket 62 on the end of the shaft and the straight cylindrical portion 68 of the socket-like pocket 64 on the disc are formed between the spherical socket-like pocket 64 and a short spherical socket-like pocket 70, and between the spherical socket-like pocket 64 and a short spherical socket-like pocket 72 formed respectively on the end of the shaft and on the wall surface of the cup-like recess 64 in the disc rear face. Each of the balls 56 travels trapped on the socket-like pocket surfaces during a complete revolution of the angle coupling 38, and the balls generally occupy a self-established neutral position.

The angle coupling is assembled by placing the disc 16 on a horizontal plane, with the undercut cupped portion 64 directed upwardly, disposing the balls in the socket-like pockets and introducing the end 60 of the shaft into the cupped portion 64 in the disc. The whole assembly is then reversed vertically so that the disc is on the top and the shaft is on the bottom and pulled away from each other as far as they will go. The balls 56 then wedge between the socket-like pockets in both the shaft and the wall of the cupped recess in the disc and remain trapped therebetween. The preload force on the discs and associated shafts resulting from the adjustment of the bearing retainers 36 and 53 holds the diverse elements in position, and that preload results in a pull exerted respectively on the shafts 34 and 36 and is transmitted through the intermediary of the balls 56 in the couplings 38 to the discs 16 and 18 respectively.

Figure 7:
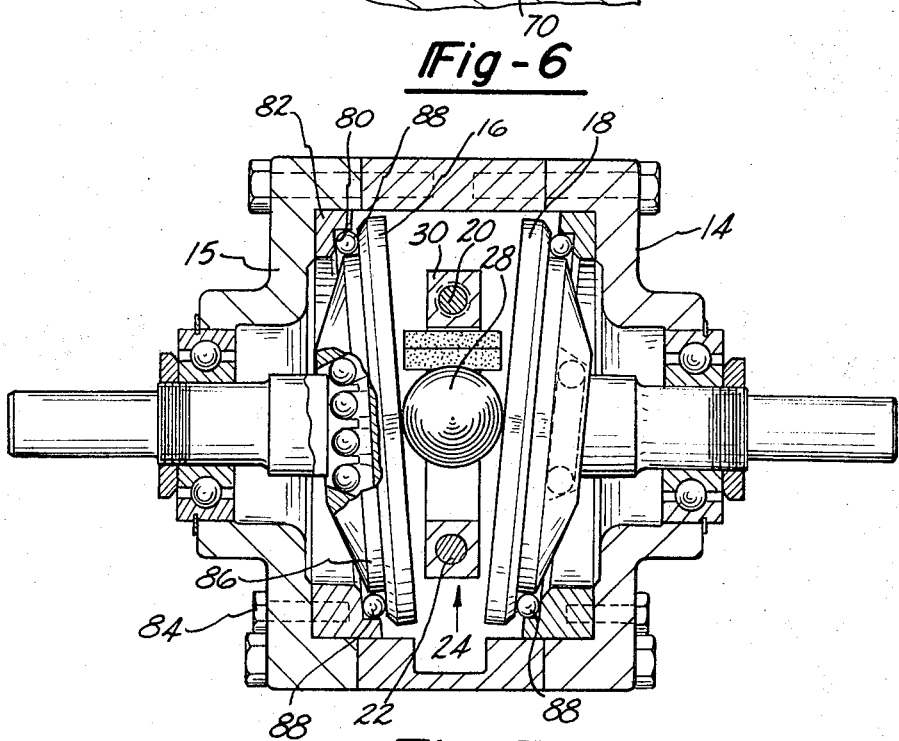
FIG. 7 is a view similar to FIG. 2 and showing a modification of the structure thereof.

FIG. 7 represents a torque transmitting mechanism in all respects identical to that illustrated at FIGS. 1–2, except that the thrust bearing means supporting the disc 16 from the end plate 15 and the disc 18 from the end plate 14 is substantially simplified as a result of forming a skewed integral raceway in the end plate, or, alternately and as shown, by providing an annular raceway insert 82 mounted on each of the end plates by way of bolts 84. The rear face of the disc 16 or 18 is provided with a shouldered reduced diameter portion 86 which defines the raceway depending from the disc, and a plurality of balls 88 are disposed between the two raceways 82 and 86. It is to be noted that the engagement of the balls 88 with each of the respective raceways is effected as a line contact along two circles, which have been found to be a very effective and simple way of obtaining a reliable thrust bearing.

Having thus described the invention by way of examples of specific embodiments thereof, what is claimed as new and sought to be protected by U. S. Letters Patent is as follows:

1. A motion transmitting mechanism comprising a pair of shafts, a pair of discs mounted spaced from each other with their faces mutually angularly inclined, the axes of rotation of said discs being offset by a predetermined distance, a ball in engagement with the surface of each of said discs, and guiding means for said ball comprising a pair of spaced parallel rod members for linearly displacing said guiding means radially relatively to the faces of said discs to vary the speed at which one disc drives the other, said guiding means for said ball comprising a lubricating wick in contact with the peripheral surface of said ball, and constant angular velocity coupling means connecting each of said shafts to a different one of said discs, wherein said constant angular velocity coupling means comprises a recessed cupped portion on each disc, a plurality of socket-like pockets formed at the end of each shaft end, a like plurality of socket-like pockets formed in the opposed surface of the cupped portion of the disc, and a ball disposed in each of said pairs of opposed pockets.

2. The mechanism of claim 1 wherein each of said shafts and the disc connected thereto are supported by separate bearing means, the bearing means supporting said disc are of the thrust bearing type disposed substantially at the periphery of each disc, and means are provided for placing a load on said bearings supporting said disc in a direction substantially parallel to the force exerted by said ball on said discs when in driving engagement therewith.

3. A motion transmitting mechanism comprising a driving disc and a driven disc, each having its forward face spaced one from the other and inclined at a relatively small angle relative to the other, a pair of parallel offset shafts, each coupled to one of said discs, an intermediate ball retained between the faces of said discs and in tangential contact therewith, cage means for displacing said ball along a linear path between the faces of the driving and driven discs for causing a variation in the speed of the driven disc relative to the driving disc, thrust bearing support means rotationally supporting each of said discs about the periphery thereof for maintaining said discs against axial displacement away from each other as a result of the pressure exerted thereon by said ball while in driving engagement with the faces of said discs, means for exerting a predetermined preload on said discs in a direction parallel to said pressure exerted by said ball, and constant angular velocity coupling means connecting each of said shafts to one of said discs, said coupling means comprising an end portion of said shaft having a plurality of ball retaining recesses formed therein projecting in a cupped recess about the axis of rotation of said disc on the rear face thereof, a plurality of ball retaining recesses in the wall surface of said cupped recess, each of said ball retaining recesses comprising successively a spherical concave portion, a tangential cylindrical portion and a spherical concave portion, and a ball disposed partly in peripheral engagement with the surface of corresponding ball retaining recesses.

4. The mechanism of claim 3 wherein said intermediate ball is disposed in a cage, said cage being supported and guided for linear displacement between said discs by means of a pair of parallel support and guiding rods.

5. The mechanism of claim 4 wherein a pair of roller elements are mounted on said cage for supporting said intermediate ball therebetween.

6. The mechanism of claim 5 wherein a wick is mounted on said cage, said wick having one end in contact with the surface of said intermediate ball and another end dipping in a source of lubricant for continuously wetting the surface of said intermediate ball with a film of said lubricant.

* * * * *

UNITED STATES PATENT OFFICE
CERTIFICATE OF CORRECTION

Patent No. 3,800,606          Dated April 2, 1974

Inventor(s) LAWRENCE A. SCHOTT

It is certified that error appears in the above-identified patent and that said Letters Patent are hereby corrected as shown below:

Column 4, line 13, delete "of" and insert therein --to--.

Column 4, lines 14-15, delete "a continuation-in-part application" and insert therein --broadly similar--.

Column 5, line 17, change "on" to --between--.

Signed and sealed this 18th day of March 1975.

(SEAL)
Attest:

RUTH C. MASON
Attesting Officer

C. MARSHALL DANN
Commissioner of Patents
and Trademarks